United States Patent [19]

Pechacek

[11] 4,054,224

[45] Oct. 18, 1977

[54] VESSEL ASSEMBLY

[75] Inventor: Raymond E. Pechacek, Houston, Tex.

[73] Assignee: Hahn & Clay, Tex.

[21] Appl. No.: 607,210

[22] Filed: Aug. 25, 1975

Related U.S. Application Data

[63] Continuation of Ser. No. 486,304, July 8, 1974, abandoned.

[51] Int. Cl.² ............... B65D 45/16; B65D 7/02; B65D 7/42
[52] U.S. Cl. ................... 220/5 A; 220/66; 220/325
[58] Field of Search ............ 220/66, 3, 5 A, 253, 220/315, 323, 324, 325, 327

[56] References Cited

U.S. PATENT DOCUMENTS

| | | | |
|---|---|---|---|
| 2,797,948 | 7/1957 | Tangard | 220/315 X |
| 3,739,589 | 6/1973 | Wolfe | 220/324 X |
| 3,780,901 | 12/1973 | Pechacek | 220/5 A X |
| 3,895,735 | 7/1975 | Clay | 220/315 X |

OTHER PUBLICATIONS

Manufacturing Drawing from Hahn & Clay, 2/17/66, Assembly of Pin Handling Device, drawn by P. D. Miller.

*Primary Examiner*—William Price
*Assistant Examiner*—Steven M. Pollard
*Attorney, Agent, or Firm*—Pravel, Wilson & Gambrell

[57] ABSTRACT

A vessel assembly including an improved connection of head and shell wherein annular seal rings are pre-compressed by insertion of radial pins, which pins are placed and retained in an inserted position by a retention, lock shaft.

1 Claim, 5 Drawing Figures

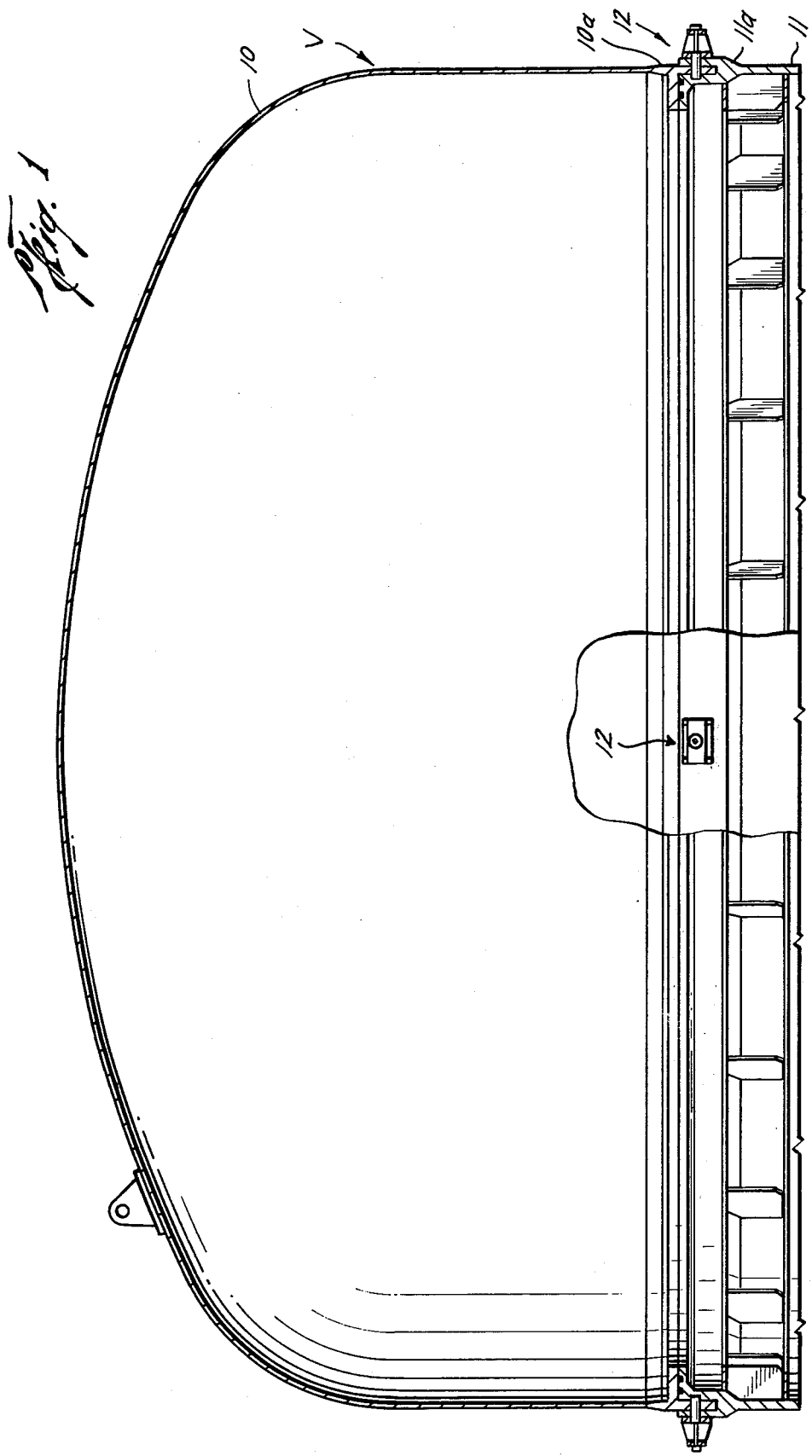

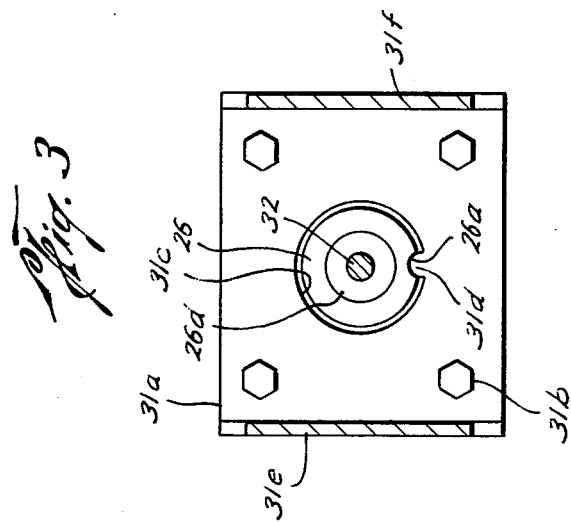
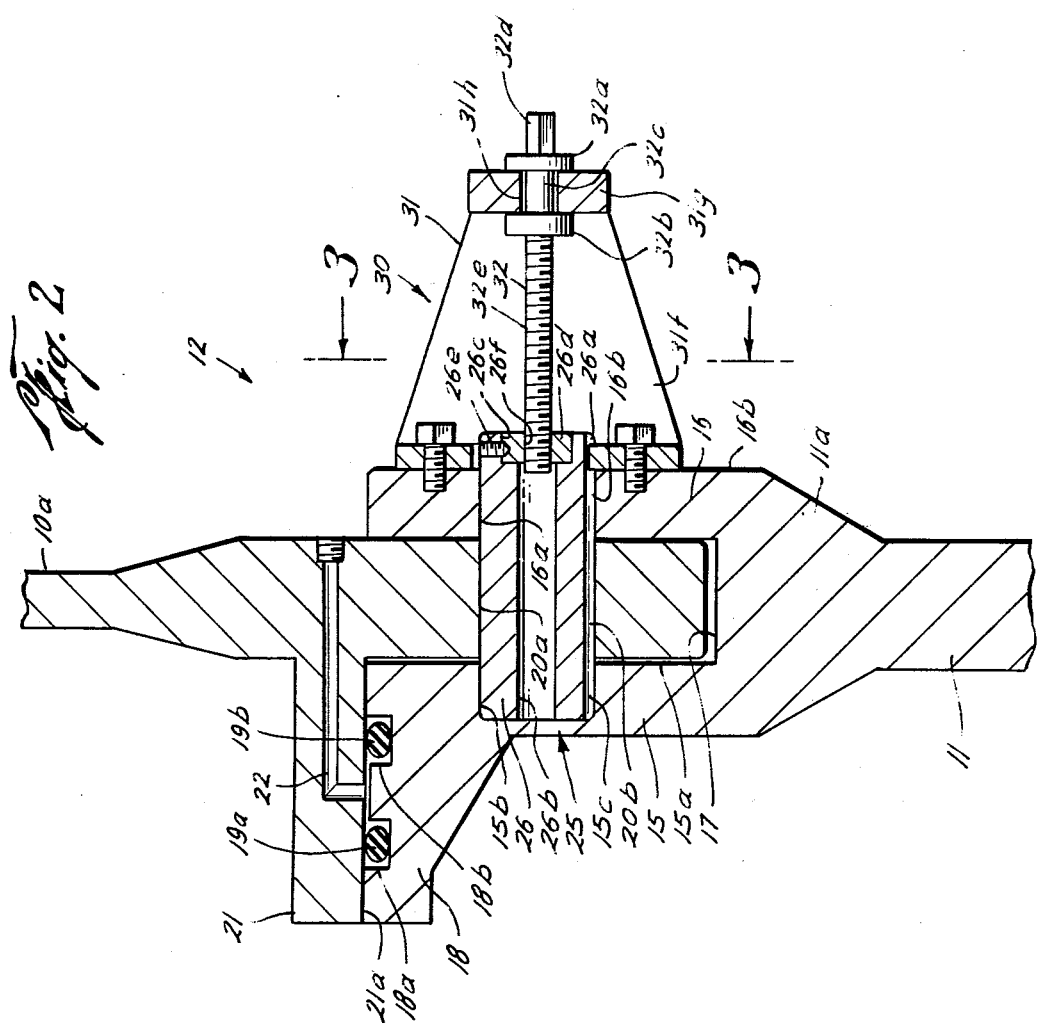

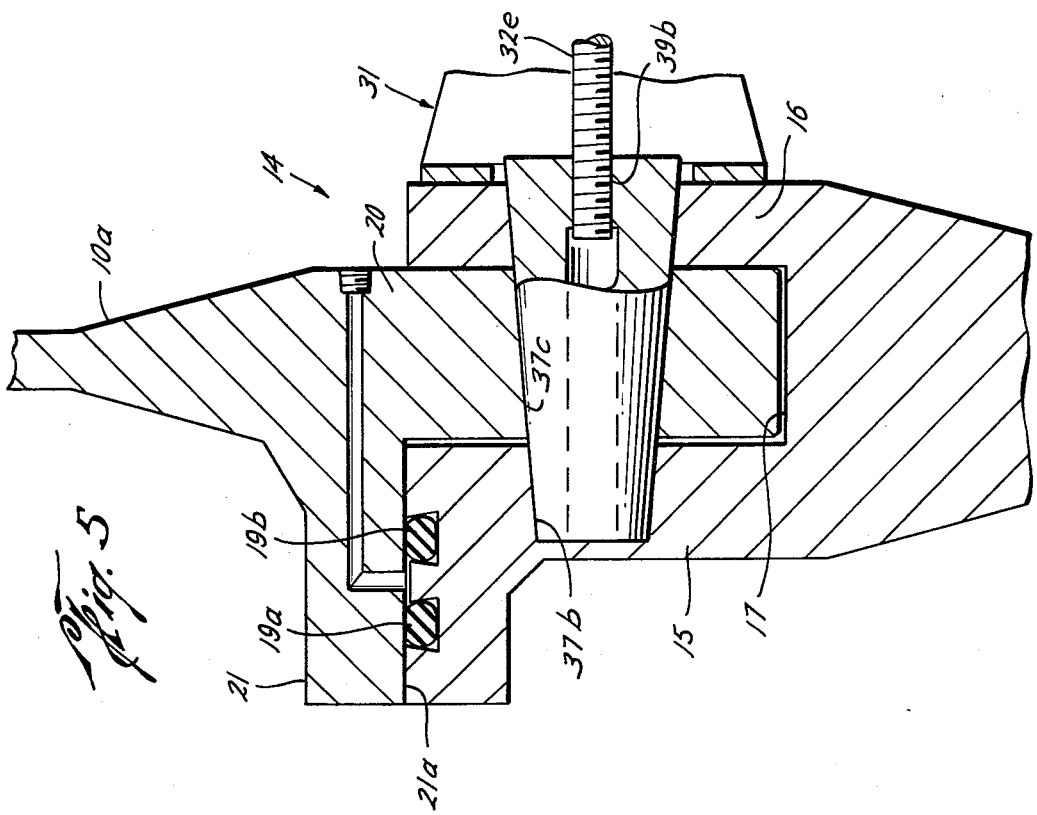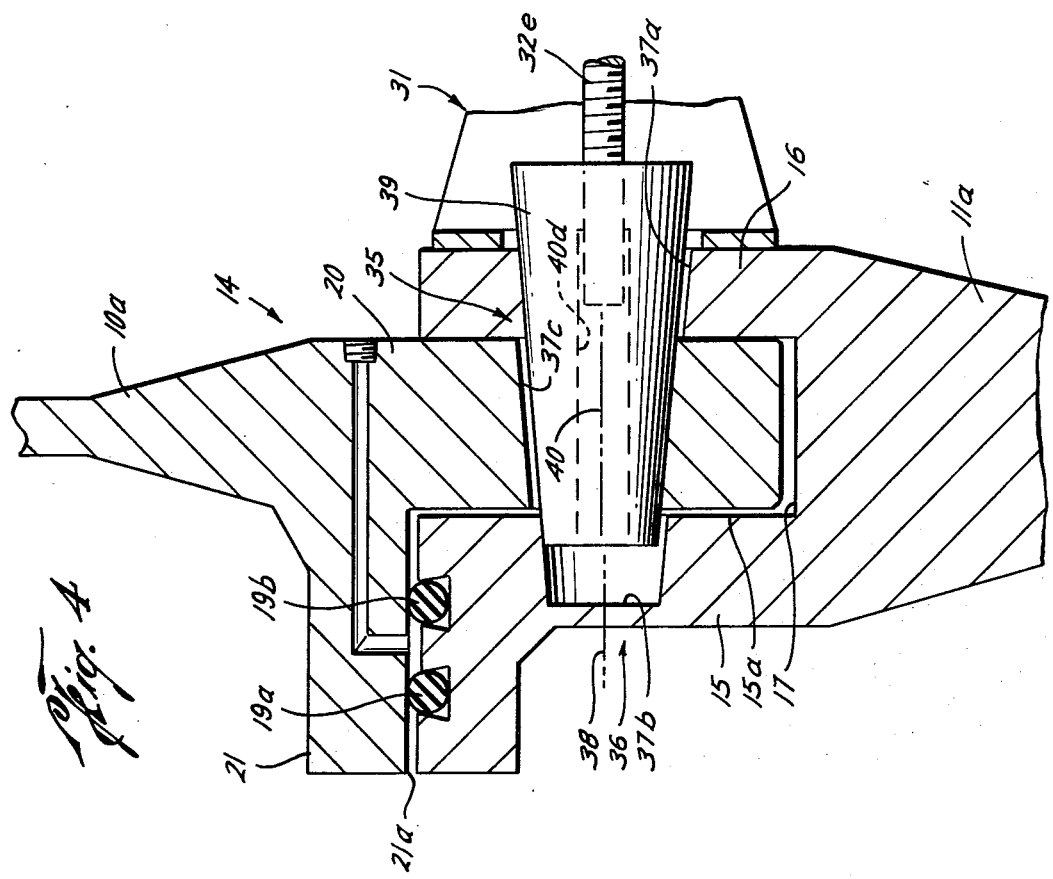

VESSEL ASSEMBLY

This is a continuation, of application Ser. No. 486,304, filed 7/8/74 now abandoned.

BACKGROUND OF THE INVENTION

The field of this invention is vessel assemblies for operation at high temperatures or under other extreme conditions.

Vessels utilizing a pin-type connection to connect the vessel shell and head are known. For example, U.S. Pat. No. 3,372,828, issued to this inventor, discloses the use of both straight and tapered pins for making vessel connections. There are requirements, particularly in the nuclear industry, for a double seal between the vessel shell and head for making pressure tests while the vessel is in use. When large seal rings are used on the large vessels, the weight of the head (if the vessel is in a vertical position) may be inadequate to adequately pre-compress the seals to provide effective sealing during operation. Of course, the vessel, head, without regard to head weight, cannot pre-compress the seals when the vessel is horizontally positioned. Whenever the vessel is either horizontal or disposed in a vertical position, but is too light to effectively pre-compress the seals, some type of pre-loading device is used to pre-compress the seals.

Another problem encountered in pin-type vessels is the tendency of the radially positioned pins to move or "rachet" outwardly because of relative movement between the vessel section annular connector rings which hold the pins.

SUMMARY OF THE INVENTION

This invention relates to a new and improved vessel connection for connecting a vessel head to a vessel shell wherein the connection is of a pin-type which retains or returns the pins to their initial, inserted position in spite of temperature or pressure cycling and further preloads annular seal rings positioned between the vessel and head sections. In the preferred embodiment of this invention, a first vessel section is provided with an annular end portion which is formed of concentric connector rings separated by an annular recess. A second vessel section has an annular end portion which includes a connector ring for insertion into the annular recess of the first vessel section. Seal means are mounted onto the annular end portions of the vessel sections for providing a seal between such vessel sections. Further, the connector rings of the first and second vessel sections include a plurality of circumferentially spaced sets of holes for receiving connector pins. A pin retainer means is mounted with each of the pins for placing the pins in an initial inserted position in the sets of holes and for retaining the pins in or returning the pins to such initial inserted position in spite of relative, radial movement of the connector rings, which connector ring movement tends to force the pins out of position.

Further, pre-compression means are mounted with and form part of the vessel sections for pre-compressing the annular seals in order to insure that such annular seals effectively seal off the connection between the first second vessel sections.

BRIEF DESCRIPTION OF THE DRAWINGS

FIG. 1 is a side view, principally in section, of a vessel utilizing the pin-type connection of the preferred embodiment of this invention;

FIG. 2 is a sectional view of the vessel connection of FIG. 1;

FIG. 3 is a sectional view taken along line 2—2 of FIG. 2 of the retainer bracket of the pin-type connection of this invention;

FIG. 4 is a sectional view of another embodiment of the vessel connection using tapered pins, wherein the initial non-alignment of the vessel holes is illustrated; and FIG. 5 is a sectional view of the vessel connection embodiment of FIG. 4 with the tapered pin fully inserted in the set of connector ring holes thereby pre-compressing the annular seal rings.

DESCRIPTION OF THE PREFERRED EMBODIMENT

Referring to the drawings, the letter V generally designates a vessel which may be positioned either horizontally or vertically for operating at high temperatures and pressures or under other extreme conditions. The vessel includes a vessel head 10 which is mounted onto a vessel shell 11 by a vessel connection means 12 (FIGS. 2 and 3) or 14 (FIGS. 4 and 5).

The vessel shell 11 includes an end portion 11a which is welded or otherwise attached to the main body of the vessel shell (not shown). The end portion 11a includes concentric rings 15 and 16 which are radially spaced to form an annular groove 17. The concentric rings 15 and 16, in the embodiment of the invention illustrated, are formed or machined integrally with the annular vessel shell end portion 11a. The annular shell end portion 11a further includes an internal, annular rim portion 18 which has machined therein concentric, radially spaced annular grooves 18a and 18b, which annular grooves mount annular seal rings or gaskets 19a and 19b therein.

The vessel head 10 indicates annular end portion 10a which includes a concentric ring 20 for insertion into the annular shell goove 17 between concentric shell rings 15 and 16. The annular head end portion 10a further includes an internal rim portion 21 for mounting over the shell internal rim portion 18 in sealable engagement with seal rings 19a and 19b. The seal rings 19a and 19b may be made of a suitable rubber or polymer or, in the alternative, may be some type of metal, all of which are well-known to those in the fields utilizing the vessels V of this invention.

In the nuclear field, there are some requirements that double, radially spaced seal rings such as 19a and 19b be used, particularly in conjunction with a seal test passage 22 which provides fluid communication between the exterior of the vessel head 10 and the annular space between the seal rings 19a and 19b. The passage 22 is used particularly to test the seal strength of the seals 19a and 19b when the vessel V is in use. In order for the seal rings 19a and 19b to seal effectively, the rings must be sufficiently pre-compressed by the internal, annular rim face 21a to cause the seal rings to effectively seal under pressure from within the vessel V.

The vessel V of this invention is designed in particular for use under high temperature or high pressue conditions. And, during such use, it is not uncommon for the entire vessel, including the vessel shell 11 and vessel head 10, to be subject to cyclic temperature and/or pressure variations which may cause relative expansion and thus radial movement, between the vessel head ring 20 and the vessel shell concentric rings 15 and 16. It is thus necessary, in many cases, to properly design the thickness of the head connector ring 20 or the width of the annular receiving groove 17 in the shell 11 such that an annular clearance such as 15a is provided to compensate for such relative, radial expansion or contraction.

The connector means 12, which is illustrated in detail in FIGS. 2 and 3, include a plurality of sets generally designated as 25 of openings or recesses in shell rings 15 and 16 and in head ring 20 for receiving pins 26. The sets 25 of holes are circumferentially spaced about the shell rings 15 and 16 and head ring 20 in approximate radial alignment as discussed below. The arrangement of FIG. 2 for a set 25 of holes for receiving the pin 26 is representative of all the circumferentially spaced sets.

Referring now to FIGS. 2 and 3, outer shell concentric ring 16 has opening 16a therein, which opening 16a is in alignment with the circular recess or opening 15b in shell concentric, inner ring 15. The vessel head concentric ring 20 has an opening 20a therein. When the vessel head 10 is initially mounted onto the vessel shell 11, the vessel head connector ring 20 is placed into the shell annular groove 17. In this initial position, which is not illustrated, the lower annular rim face 21a rests on top of the seal rings 19a and 19b. The weight of the head 10, if in a vertical position as illustrated in FIG. 1, is generally not sufficient to sufficiently pre-compress the seal rings 19a and 19b. In order to cause the seal rings 19a and 19b to be initially pre-compressed upon receipt of the pin 26, the head ring opening 20a must be positioned for alignment with the concentric ring openings 16a and 15b.

In other words, when the head 10a initially placed onto the shell 11, the head ring 20 rests in a position such that the head ring opening 20a is above and slightly out of alignment with the concentric ring openings 16a and 15b in the shell 11. External force must then be used to press down on the head 10 to pre-compress the gaskets 19a and 19b and, at the same time, move the head ring openings 20a into alignment with the concentric ring openings 16a an 15b on the shell 11. Once in alignment, with the seal rings 19a and 19b compressed by the internal annular rim face 21a, the pin 26 will then be inserted. In this manner, the connector means 12 serves to pre-compress the seal rings 19a and 19b sufficiently to cause them to make effective seal.

The shell concentric ring opening 16a has a radially directed ridge portion 16b which is aligned with the radially directed ridge portion 15c of the circular recess or hole 15b. Further, the head annular ring 20 includes a ridge 20b in opening 20a, which ridge 20b aligns with opening ridges 16b and 15c when the opening 20a is aligned with openings 16a and 15b to receive the pin 26. The pin 26 includes a longitudinally directed groove 26a for mounting over the ridge portions 16b, 20b and 15c whereby the pin 26 is held against rotation in the initial, inserted position illustrated in FIG. 2.

The pin 26 includes a longitudinally extending bore 26b having a counter-sunk, enlarged bore portion 26c at the outer end thereof. A nut 26d is mounted in the counter-sunk bore portion 26c and is held in place by set screw 26e. One of the purposes of the longitudinal pin bore 26b is to prevent air ock as the pin is inserted into the aligned openings 16a, 20a and 15b.

A retainer means generally designated as 30 is mounted onto the outside, annular wall 16d of shell concentric ring 16 over each pin 26 for placing the pin in the initial, inserted position illustrated in FIG. 2, for removing the pin from such inserted position and further for absorbing or preventing undesired radial movement of the pin 26 after insertion into the ring openings 16a, 20a and 15b. The retainer means 30 includes a bracket or support 31 which mounts a lock shaft 32 for threaded engagement with the pin 26. The bracket 31 includes a base plate 31a which is mounted by screws 31b over the hole 16a in shell concentric ring 16. The base plate 31a has a circular opening 31c which is aligned with the concentric ring opening 16a and further includes a ridge portion 31b which aligns with ridge portion 16b of the outer, concentric connector ring 16. Side bracket plates 31e and 31f are mounted onto and extend outwardly from the base 31a and are joined with outer end plate 31g by suitable means such as welding. The outer end or mounting plate 31g includes an opening 31h for mounting the lock shaft 32 therein for rotation. Retainer washers 32a and 32b properly confine lock shaft portion 32c within the outer plate opening 31h, thus mounting the lock shaft 32 for rotation. The lock shaft 32 includes an outer end 32d which has an hexagonal shape for receiving any suitable tool such as an air wrench or the like. And, inner shaft portion 32e of the lock shaft 32 is entirely threaded for threadedly engaging inner, threaded nut opening 26f.

In the operation and use of the vessel V including the vessel connector means 12, the vessel V may be in either a horizontal position or in the vertical position illustrated in the drawings. In order to connect the head 10 onto the shell 11, the head 10 is placed onto the vessel 11 such that head annular ring 20 is mounted in the shell annular groove 17 between the concentric connector rings 15 and 16. Initially, the hole 20a in head connector ring 20 is not fully aligned with the holes 16a and 15b in the shell connector rings 16 and 15, respectively. This is due to the resistance to deformation of the two annular seal rings 19a and 19b. In order to align the ring opening 20 with the ring openings 16a and 15b in each set 25 of holes, the shell 10 must be pressed inwardly by some kind of external force, against the yieldable resistance offered by the gaskets 19a and 19b. Assuming that such external force is used, the head connector ring opening 20a is brought into a position of alignment with the openings 16a and 15b, thereby precompressing the seal rings 19a and 19b. And, at this point, the pin 26a is moved to the fully inserted position of FIG. 2.

In the preferred embodiment of the invention described herein, the retainer means 30 is used to insert the pin 26 into the aligned openings. Initially, the pin 26 is mounted onto the threaded portion 32e of the lock shaft 30 and is positioned such that the pin 26 rests in the outer shell connector ring opening 16a. Suitable tool means such as an air wrench mounted over the outer lock shaft end 32d is then used to rotate the screw shaft in the proper direction to move the pin 26 inwardly through head connector ring opening 20a and into the inner, shell connector ring opening or recess 15b, thus fully inserting the pin 26 into the set 25 of openings.

Similarly, when it is desirable to remove the pin 26, the air wrench or other suitable tool rotates the lock shaft 32 in the other direction thereby moving the pin 26 out of the head concentric ring opening 20a to a position such that the pin 26 rests or is seated in only the shel concentric ring opening 16a. With the pins 26 on all the connector means 12 removed to this outer position, the head can be removed. The same procedure is used to later re-connect the head 10 and shell 11 utilizing the retainer means 30.

The vessel V may be subject to cyclic temperature or pressure changes or the like which cause relative, radial movement between one or more of the shell connector rings 15 and 16 and the head connector ring 20. When this relative radial movement between the connector rings such as 15 and 20 occurs, the pin is forced radially outwardly out of its initial, fully inserted position as illustrated in FIG. 2. The retainer means 31 acts to absorb this outer, radial movement, or "rachet" effect, of the pin 26, which likewise displaces the lock shaft 32. That is, the lock shaft 32 is moved outwardly with the pin 26 such that the outer plate 31g of the bracket 31 tends to bend outwardly and thus absorb this radial pin displacement. And, whenever the force tending to push the pin 26 outwardly stops, the resilience of the bracket 31 causes the bracket 31 and lock shaft 32 to move radially inwardly thus pushing the pin 26 back into the fully inserted position of FIG. 2. It is also possible that, in some situations, the force pushing the pin 26 outwardly, as caused by the relative movement of the connector rings such as 15 and 20, may be insufficient to actually distort the lock shaft 32 and/or bracket 31, in which case the bracket 31 fully holds the pin 26 in its initial, fully inserted position. In either event, whether by full retention or by returning the pin 26 to its initial position after dispacement, the retainer means 30 acts to essentially retain the pins 26 in an active, effective inserted position within the connector rings 16, 20 and 15.

The connector means illustrated in FIGS. 4 and 5 includes means generally designated as 35 for pre-compressing the seal rings 19a and 19b without the need for externally applied force. In describing the connector means 14, like numbers and letters will be used to describe the basic vessel head 10 and shell 11 and also the retainer means 31 since such elements are basically identical to the structure heretofore described. Therefore, only the new or different elements will be numbered differently in describing the vessel V and connector means 14 of FIGS. 4 and 5.

The annular, connector rings 15 and 16 of the shell 11 and the connector ring 20 of the head 10 has circumferentially spaced sets 36 of openings therein, one set of such openings being illustrated in FIGS. 4 and 5. The outer, annular shell ring 16 includes a tapered, radially inwardly converging opening 37a. The inner, shell concentric ring 15 has a tapered, radially inwardly converging opening or recess 37b machined therein. The opening 37b in the inner connector ring 15 has the same center line 38 as the opening 37a in connector ring 16 such that the two openings are fully aligned to receive a tapered, radially inwardly converging pin 39. The head connector ring 20 includes a tapered, radially inwardly converging opening 37c therein which cooperates with the conentric ring openings 37a and 37b to form part of each circumferentially spaced set 36 of openings which receive the pin 39. However, the opening 37c in the connector ring 20 is initially only partially aligned with the concentric ring openings 37a and 37d. When the head 10 is mounted on the shell 11, as previously mentioned, the inner rim face 21a on annular end portion 10a of the head 10 rests on the seal rings 19a and 19b and does not deform the seal rings. In this initial position, when the seal rings 19a and 19b or not deformed, or are not deformed sufficiently, the center line 40 of the head concentric ring opening 37c is slightly above the center line 38 for the shell connector ring openings 37a and 37b.

In FIG. 4, the pin 39 is illustrated as partially inserted into the set 36 of openings. It should be noted that the pin 39 has an axial bore therein 40a to prevent air lock or the like and further includes a threaded end portion or bore 39b adapted to receive the threaded portion 32e of the lock shaft 32. The retainer means 31 is used to move the pin 39 from the initial, partially inserted position of FIG. 4 to the fully inserted position of FIG. 5. This is accomplished by rotating the lock shaft 32, mounted in the bracket 31. The tapered pin 39 acts to cam against the tapered opening 37c to move the head concentric ring 20 further into the groove 17 as the lock shaft 32e is rotated to move the pin 39 radially inwardly. In this manner, the tapered pin 39 acts to cam or wedge the head connector ring 32 downwardly until the pin 39 is fully inserted into the inner, concentric ring tapered opening 37b.

In the fully inserted pin position, the head connector ring opening 37c is completely aligned with the shell connector ring openings 37a and 37b, such that the entire end portion 10a of the head 10 has been moved downwardly causing the internal annular rim face 21a to sufficiently deform or pre-compress the seal rings 19a and 19b that the seal rings 19a and 19b will effectively seal under operating conditions. Thus the pin 39, in cooperation with the retainer means 31, acts to pre-compress the seal rings 19a and 19b without the need for external force. The radially inwardly tapered pin 39 acts to cam or wedge against the head concentric ring opening 37c to move the head annular ring 20 further into the groove 17 thereby causing precompressing or pre-loading of the sealing rings 19a and 19b. And, in the final, fully inserted position illustrated in FIG. 5, the head connector ring opening 37c has a center line that is aligned with the center line 38 of the shell connector ring openings 37a and 37b. Also, the center line or axis of the pin 39 is identical to the ring opening center line 38.

The foregoing disclosure and description of the invention are illustrative and explanatory thereof, and various changes in the size, shape, and materials as well as in the details of the illustrated constructed may be made without departing from the spirit of the invention.

I claim:

1. A new and improved vessel structure, comprising:
   a first vessel section having an annular end portion formed of concentric connector rings separated by an annular recess;
   a second vessel section having an annular end portion including a connector ring for insertion within said annular recess of said first vessel section with some clearance being formed between said connector ring of said second vessel section and said concentric connector rings of first vessel section annular end portion with said connector ring of said second annular end portion inserted into said annular recess of said first annular end portion;
   seal means mounted on said annular end portions of said vessel sections for sealing said first and second vessel sections;
   said connector rings of said first and second vessel sections including a plurality of circumferentially spaced sets of holes and a connector pin positioned in each of said sets of holes, one of said holes in said sets of holes including a retention ridge, and said pin having a groove for receiving said retention ridge for holding said pin against rotation; and
   a pin retainer means mounted with each of said pins for placing said pin in an inserted position in said holes and for retaining said pin in said inserted position in spite of relative, radial movement of said connector rings which is caused from temperature or pressure differential or the like, said pin retainer means including means mounted in engagement with said pin for temporarily yielding in response to outward radial displacement of said pin from an inserted position and for returning said pins to said inserted position, including:
a lock shaft being threaded and engaging a bore in said pin;
a bracket mounting said lock shaft for rotation, said bracket including an outer bracket member and means mounting said outer bracket member in a position spaced from said first vessel section, said lock shaft being mounted for rotation in said outer bracket member and said outer bracket member being temporarily bendable outwardly in response to outward radial displacement of said pin from said inserted position, said outer bracket member returning said pin to said inserted position as said outer bracket member returns to an initial, unbent position.

* * * * *